US012634894B2

(12) United States Patent
Mandelli et al.

(10) Patent No.: US 12,634,894 B2
(45) Date of Patent: May 19, 2026

(54) METHOD TO MULTIPLEX SENSING AND COMMUNICATION SERVICES IN WIRELESS NETWORKS

(71) Applicant: Nokia Technologies Oy, Espoo (FI)

(72) Inventors: Silvio Mandelli, Stuttgart (DE); Maximilian Arnold, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 310 days.

(21) Appl. No.: 18/569,055

(22) PCT Filed: Jun. 13, 2022

(86) PCT No.: PCT/FI2022/050408
§ 371 (c)(1),
(2) Date: Dec. 11, 2023

(87) PCT Pub. No.: WO2023/017208
PCT Pub. Date: Feb. 16, 2023

(65) Prior Publication Data
US 2024/0276457 A1 Aug. 15, 2024

(30) Foreign Application Priority Data
Aug. 13, 2021 (EP) ..................................... 21191343

(51) Int. Cl.
*H04W 72/04* (2023.01)
*H04W 4/38* (2018.01)
(52) U.S. Cl.
CPC ............. *H04W 72/04* (2013.01); *H04W 4/38* (2018.02)
(58) Field of Classification Search
CPC ....... H04W 72/04; H04W 4/38; H04W 72/20; H04W 72/044; H04L 27/2601;
(Continued)

(56) References Cited

U.S. PATENT DOCUMENTS

2017/0033916 A1* 2/2017 Stirling-Gallacher ......................
H04W 72/0446
2019/0191442 A1* 6/2019 Lu .......................... H04W 36/06
(Continued)

FOREIGN PATENT DOCUMENTS

CA 3073572 A1 * 5/2019 ............. H04W 72/02
CA 3049691 C * 2/2024 ........... H04B 7/0456
(Continued)

OTHER PUBLICATIONS

Office action received for corresponding European Patent Application No. 21191343.9, dated Aug. 13, 2025, 8 pages.
(Continued)

*Primary Examiner* — Mahendra R Patel
(74) *Attorney, Agent, or Firm* — McCarter & English, LLP

(57) ABSTRACT

A method comprising, gathering information about one or more sensing service requests raised in a communication network, wherein said communication network comprises sensing and/or data nodes, allocating in response to said one or more sensing service requests a plurality of resources within resources to perform communication of said communication network as resources to perform sensing operations for carrying sensing signals of said sensing nodes, assigning one or more of the allocated resources to perform sensing operations to the sensing nodes, and granting the respective sensing nodes access to the assigned resources to perform sensing operations.

17 Claims, 7 Drawing Sheets

(58) Field of Classification Search

CPC . H04L 27/0006; H04L 5/0073; H04L 5/0082; H04L 5/0023; H04L 5/0048; H04L 5/0091

USPC .......................................................... 370/329

See application file for complete search history.

(56) References Cited

U.S. PATENT DOCUMENTS

| | | | |
|---|---|---|---|
| 2019/0239202 A1* | 8/2019 | Bhattad ................. | H04W 76/11 |
| 2019/0342944 A1* | 11/2019 | Chatterjee ............. | H04W 80/08 |
| 2020/0229171 A1* | 7/2020 | Khoryaev ............... | H04W 4/40 |
| 2021/0076367 A1 | 3/2021 | Bayesteh et al. | |
| 2021/0076417 A1* | 3/2021 | Bayesteh .............. | H04W 76/27 |
| 2021/0136699 A1 | 5/2021 | Scholand et al. | |
| 2022/0225121 A1* | 7/2022 | Wanuga ................ | H04W 16/28 |

FOREIGN PATENT DOCUMENTS

| | | | | | |
|---|---|---|---|---|---|
| CN | 109565387 A | * | 4/2019 | ............ | H04W 72/23 |
| EP | 3439416 A1 | * | 2/2019 | .......... | H04W 72/542 |
| EP | 4047963 A1 | | 8/2022 | | |
| EP | 4615150 A2 | * | 9/2025 | ......... | H04B 7/06952 |
| WO | WO-2019152414 A1 | * | 8/2019 | ............ | H04W 72/23 |
| WO | 2021/030685 A1 | | 2/2021 | | |
| WO | WO-2022040843 A1 | * | 3/2022 | ............ | G01S 7/415 |
| WO | WO-2022128074 A1 | * | 6/2022 | ............ | H04W 72/23 |

OTHER PUBLICATIONS

Chowdhury et al., "6G Wireless Communication Systems: Applications, Requirements, Technologies, Challenges, and Research Directions", IEEE Open Journal of the Communications Society, vol. 1, Jul. 20, 2020, pp. 957-975.

Akyildiz et al., "6G and Beyond: The Future of Wireless Communications Systems", IEEE Access, vol. 8, Jul. 21, 2020, pp. 133995-134030.

Ziegler et al., "6G Architecture to Connect the Worlds", IEEE Access, vol. 8, Sep. 18, 2020, pp. 173508-173520.

Bourdoux et al., "6G White Paper on Localization and Sensing", arXiv, Jun. 2, 2020, pp. 1-38.

Lieto et al., "Enabling Dynamic Resource Sharing for Slice Customization in 5G Networks", IEEE Global Communications Conference (GLOBECOM), Dec. 9-13, 2018, 7 pages.

"3rd Generation Partnership Project; Technical Specification Group Radio Access Network; NR; Physical channels and modulation (Release 16)", 3GPP TS 38.211, V16.5.0, Mar. 2021, pp. 1-134.

Wild et al., "Joint Design of Communication and Sensing for Beyond 5G and 6G Systems", IEEE Access, vol. 9, Feb. 15, 2021, pp. 30845-30857.

"3rd Generation Partnership Project; Technical Specification Group Radio Access Network; LTE Positioning Protocol (LPP (Release 16)", 3GPP TS 37.355, V16.4.0, Mar. 2021, pp. 1-298.

Viswanathan et al., "Communications in the 6G Era", IEEE Access, vol. 8, Mar. 18, 2020, pp. 57063-57074.

Tan et al., "Integrated Sensing and Communication in 6G: Motivations, Use Cases, Requirements, Challenges and Future Directions", 1st IEEE International Online Symposium on Joint Communications & Sensing (JC&S), Feb. 23-24, 2021, 6 pages.

Lima et al., "Convergent Communication, Sensing and Localization in 6G Systems: An Overview of Technologies, Opportunities and Challenges", IEEE Access, vol. 9, Jan. 21, 2021, pp. 26902-26925.

Extended European Search Report received for corresponding European Patent Application No. 21191343.9, dated Jan. 27, 2022, 10 pages.

"Introduction of network based Sensing in 5G Advanced", vivo, S2-2106008, vivo, Aug. 10, 2021, 16 pages.

Haskou et al., "Discussion on a Joint Communication and Sensing (JCS) Method", InterDigital, Inc, IEEE 802.11-21/0066r0, Jan. 2021, pp. 1-15.

International Search Report and Written Opinion received for corresponding Patent Cooperation Treaty Application No. PCT/FI2022/050408, dated Sep. 14, 2022, 16 pages.

* cited by examiner

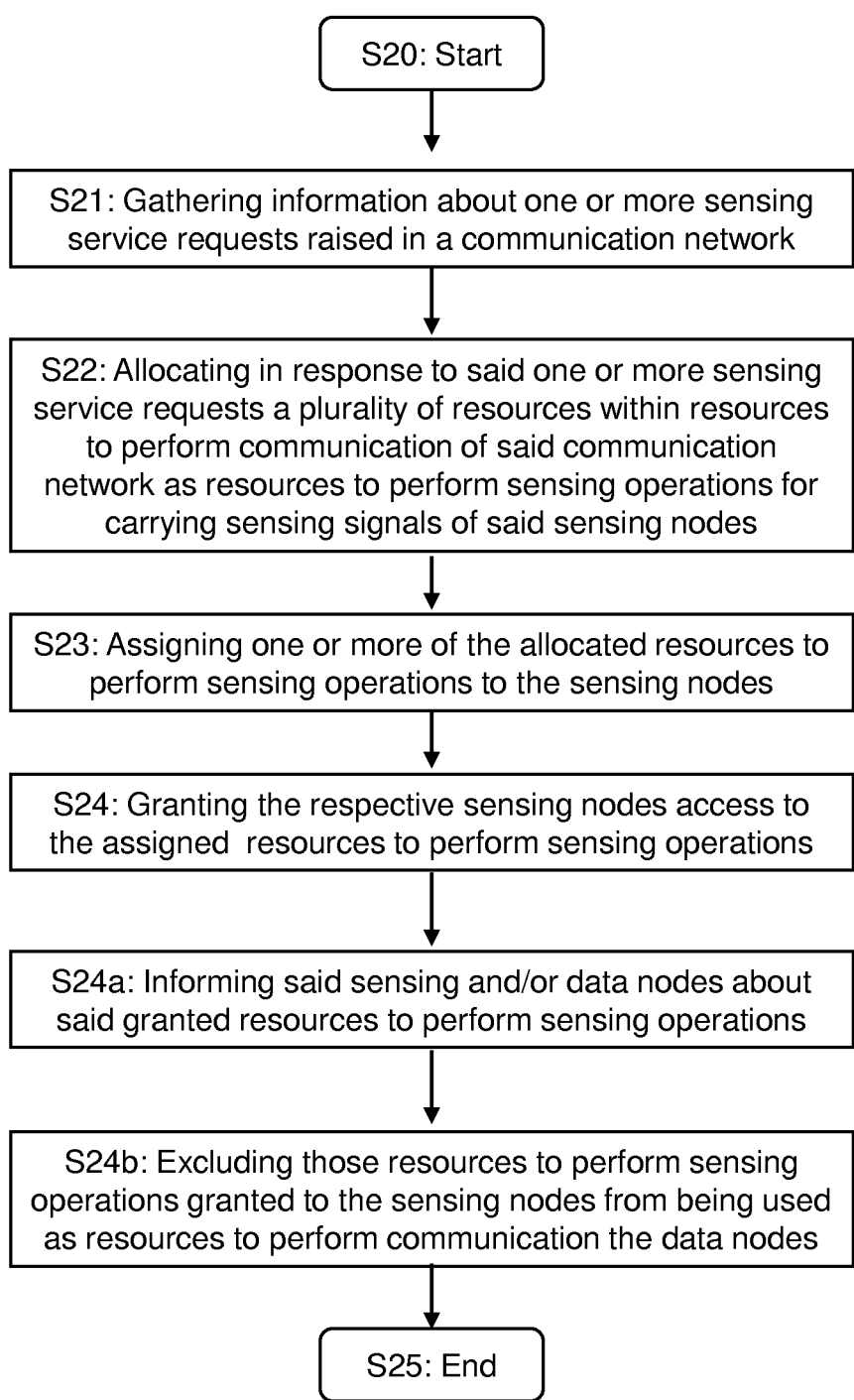

S20: Start

S21: Gathering information about one or more sensing service requests raised in a communication network S22: Allocating in response to said one or more sensing service requests a plurality of resources within resources to perform communication of said communication network as resources to perform sensing operations for carrying sensing signals of said sensing nodes S23: Assigning one or more of the allocated resources to perform sensing operations to the sensing nodes S24: Granting the respective sensing nodes access to the assigned resources to perform sensing operations S24a: Informing said sensing and/or data nodes about said granted resources to perform sensing operations S24b: Excluding those resources to perform sensing operations granted to the sensing nodes from being used as resources to perform communication the data nodes S25: End

Fig. 3

METHOD TO MULTIPLEX SENSING AND COMMUNICATION SERVICES IN WIRELESS NETWORKS

RELATED APPLICATION

This application was originally filed as PCT Application No. PCT/FI2022/050408 on Jun. 13, 2022, which claims priority from EP Application Serial No. 21191343.9 filed on Aug. 13, 2021, both of which are incorporated herein by reference in their entirety.

TECHNICAL FIELD

At least some example embodiments relate to a method to multiplex sensing and communication services in wireless networks. In particular, at least some example embodiments relate to multiplexing sensing and communications in available resources of a data communication channel in a wireless network.

LIST OF ABBREVIATIONS/ACRONYMS

3GPP: $3^{rd}$ Generation Partnership Project
5G: $5^{th}$ Generation
6G: $6^{th}$ Generation
AP: Access Point
ARP: Allocation and Retention Priority
BS: Base Station
DL: Downlink
FA: Frequency Aperture
FD: Frequency Distance
FP: Frequency Sampling Period
GBR: Guaranteed Bit Rate
gNB: Next Generation Node B
JCAS: Joint Communication and Sensing
L2: Layer 2
LMF: Location Management Function
LPP: LTE Positioning Protocol
OFDM: Orthogonal Frequency Division Multiplexing
QoS: Quality of Service
PDSCH: Physical Downlink Channel
PDSeCH: Physical Downlink Sensing Channel
PUSCH: Physical Uplink Channel
PUSeCH: Physical Uplink Sensing Channel
PRB: Physical Resource Block
PRS: Positioning Reference Signals
PSeCH: Physical Sensing Channel
PTFB: Periodic Time/Frequency Burst
Radar: Radio Detection and Ranging
RE: Resource Element
SAP: Sensing Access Point
SAS: Sensing As a Service
SB: Subframe
SC: Subcarrier
SCG: Sensing Channel Grant
SINR: Signal-to-Interference-plus-Noise Ratio
SMF: Sensing Management Function
SPS: Semi-Persistent Scheduling
S-QoS: Sensing Quality of Service
Sym: Symbol
TA: Time Aperture
TP: Time Sampling Period
TS: Time Slot
UE: User Equipment UL: Uplink

BACKGROUND

For understanding the present specification, some knowledge about the $5^{th}$ generation (5G) of mobile communication is helpful. The 5G of mobile communication drove the communication network to the physical performance bound regarding latency, throughput, and spectral efficiency.

However, the next ($6^{th}$) generation (6G) extends this network further, converting communication networks to a joint physical-biological network, where a controller can sense the state and behavior of each active and passive node/device/object within its environment.

The key challenge of the sensing network directly results from the manifold of sensing modalities, where a large amount of resources is required to serve all devices.

Further, as Joint Communication and Sensing (JCAS) is an emerging topic for wireless communication networks, so far congestion of sensing requests has not been considered in detail. Currently, sensing operations are allocated in control channels, like the Positioning Reference Signals (PRS) for downlink (DL) position measurements in 5G.

However, with the densification of Sensing Access Points (SAPs), i.e., terminals performing sensing and/or communications, and devices actively performing sensing measures (like moving vehicles performing radar and communication operations) the resources required to perform sensing operations may become scarce.

Moreover, it is to be considered that interference may limit sensing performance to the point that localization signals in 5G could be transmitted on orthogonal resources across different cells requiring blanking schemes.

Therefore, it is not possible to rely on the limited amount of resources present in control channels to handle sensing services and it is necessary to find new ways of allocating wireless resources to sensing operations in the next generation of wireless networks.

There are some works, e.g., the "Joint Design of Communication and Sensing for Beyond 5G and 6G Systems", Nokia White paper, April 2021, that propose to leverage symbols transmitted in communication data channels to perform sensing.

However, this requires knowledge of the transmitted symbols at the receiver, otherwise its estimation may be erroneous, thus impacting reliability of the sensing service.

Moreover, sensing-agnostic schemes do not practically allow for multi-cells interference control schemes and uplink (UL) sensing operations (due to the extreme uncontrolled interference). Some blanking schemes have been introduced for PRS, e.g., in "LTE Positioning Protocol (LPP)", 3GPP Technical specifications 37.355, March 2021.

However, PRS (and reference signals in general) cannot scale their allocated resources, occupying the data channel if the sensing load increases drastically.

SUMMARY

Thus, one of the key challenges for the next generation of wireless networks is to deliver sensing capabilities. As these features or services all require the same physical resource, many challenges arise, regarding sharing the resource, and determining the quality of service of such sensing capabilities.

The problem at hand refers to the need that sensing and communications must be multiplexed in the same available radio resources, like time-frequency radio resources. It shall be noted that such same radio resources may represent the radio resources that in e.g. 5G systems and/or systems previous to 5G systems are considered for data communication only, like for instance the 3GPP Physical Downlink (or Uplink) Shared Channels.

As happens in wireless communication networks, in order to limit interference, it is required that sensing/communication operations of a given cell should happen on orthogonal resources.

However, communication and sensing operations make use of resources in a completely different way.

Communications benefit from the sum over the allocated resources of the amount of bits, which can be sent over these resources, in a way somehow proportional to $\Sigma E_{r \in R} \log_2 (1+\gamma_r)$, where $\gamma_r$ is the Signal-to-Interference-plus-Noise Ratio (SINR) over the resource element r and R is the set of allocated resources to the communication service. From this point of view, communications can benefit from every resource element assigned to them, not caring too much (apart from channel selectivity) about the location in time-frequency of the resource element, if the service latency can be neglected.

Sensing benefits from a good structure of the allocated resources in the following terms For an angle of arrival estimation by means of multiple antenna array elements, multiple measures (obtained with multiple resource elements) allow to average out noise and interference. Still, reasonable performance could be obtained with minimal time-frequency allocations.

On the other hand, estimating range with high resolution would require probing the environment with signals that have a high frequency aperture (meaning that the sensing signals are allocated over a large frequency span). The frequency sampling size (how often sensing signals are allocated in the frequency domain) defines the unresolvable range. The finer the allocation, the bigger range interval does not create any alias. In practice, range estimation does not benefit much from a high amount of resources in the time domain, but from resource allocations that cover high frequency ranges with the necessary sampling interval in the frequency domain.

Doppler (speed) could be estimated by transmitting consecutive bursts with enough time aperture (affecting resolution) and time period (affecting unresolvable range).

For all of those parameters, an update rate will determine how often the sensing burst should be allocated.

From the considerations on range and Doppler, one is not interested in a huge amount of resource elements to be allocated to each sensing operation, but rather on the aperture and sampling rate of the dimension of interest. In particular, the frequency and time dimension affect the range and Doppler estimate, respectively. The aperture and sampling rate over each dimension impact the resolution and the unresolvable range, respectively.

Therefore, in 6G (and potentially in subsequent/following) networks that must handle an extreme number of devices that want to communicate and/or perform sensing operations, it is necessary to find a way to flexibly and dynamically multiplex communication and sensing operations in the shared radio spectrum.

Thus, many challenges arise, like "How to efficiently multiplex resources in the current physical channels of wireless standards to communication and sensing operations?" "How can one efficiently control this multiplexing in a running system, perhaps limiting the impact on legacy users that perform only communications?"

It is an objective of at least some example embodiments to improve the prior art. Thus, at least some embodiments deal with the question "how to efficiently multiplex sensing and communication services?"

Moreover, at least some example embodiments relate to smartly multiplexing and scheduling sensing operations in the current data channels of communication systems, and to a control structure to efficiently control this multiplexing, while having only a minor impact on current operations dealing only with communications.

The objective is achieved by the methods, apparatuses and non-transitory storage media as specified in the appended claims.

Advantageous further developments are set out in respective dependent claims.

According to at least some example embodiments, at least one of the following advantages is achieved:

Flexible and dynamic allocation of resources to sensing, allowing to leverage the full spectrum for doing communication, sensing, or a variable mix of both options.

Efficient procedure and signaling to allocate resources for sensing operations, which is completely different than the signaling tailored to assign Physical Resource Blocks (PRBs) for communications.

Efficient procedure and signaling for the communication of sensing grants to sensing devices in the network.

Procedure to negotiate sensing load in each single cell (SAP) to allocate sensing resources where and in the quantity needed, while considering the current communication load.

Light procedure and signaling for allowing legacy communication operation not to be impacted by the disclosed multiplexing of sensing and data services.

Further advantages become apparent from the following detailed description.

BRIEF DESCRIPTION OF THE DRAWINGS

Further details, features, objects, and advantages are apparent from the following detailed description of example embodiments of at least some aspects, which is to be taken in conjunction with the attached drawings, wherein:

FIG. 3 shows a flowchart illustrating an example further specified method 1 according to at least some embodiments.

DETAILED DESCRIPTION OF CERTAIN EXAMPLE EMBODIMENTS

Herein below, certain aspects are exemplified by at least some embodiments which are described in detail with reference to the accompanying drawings. Features of the example embodiments can be freely combined with each other unless otherwise described. However, it is to be expressly understood that the description of certain example embodiments/aspects is given by way of example only, and that it is not intended to be understood as limiting the application to the details disclosed.

It is to be understood that any of the modifications mentioned can be applied singly or in combination to the respective aspects to which they refer, unless they are explicitly stated as excluding alternatives.

Moreover, it is to be understood that the apparatus is configured to perform the corresponding method, although in some cases only the apparatus or only the method are described.

Figure 1:
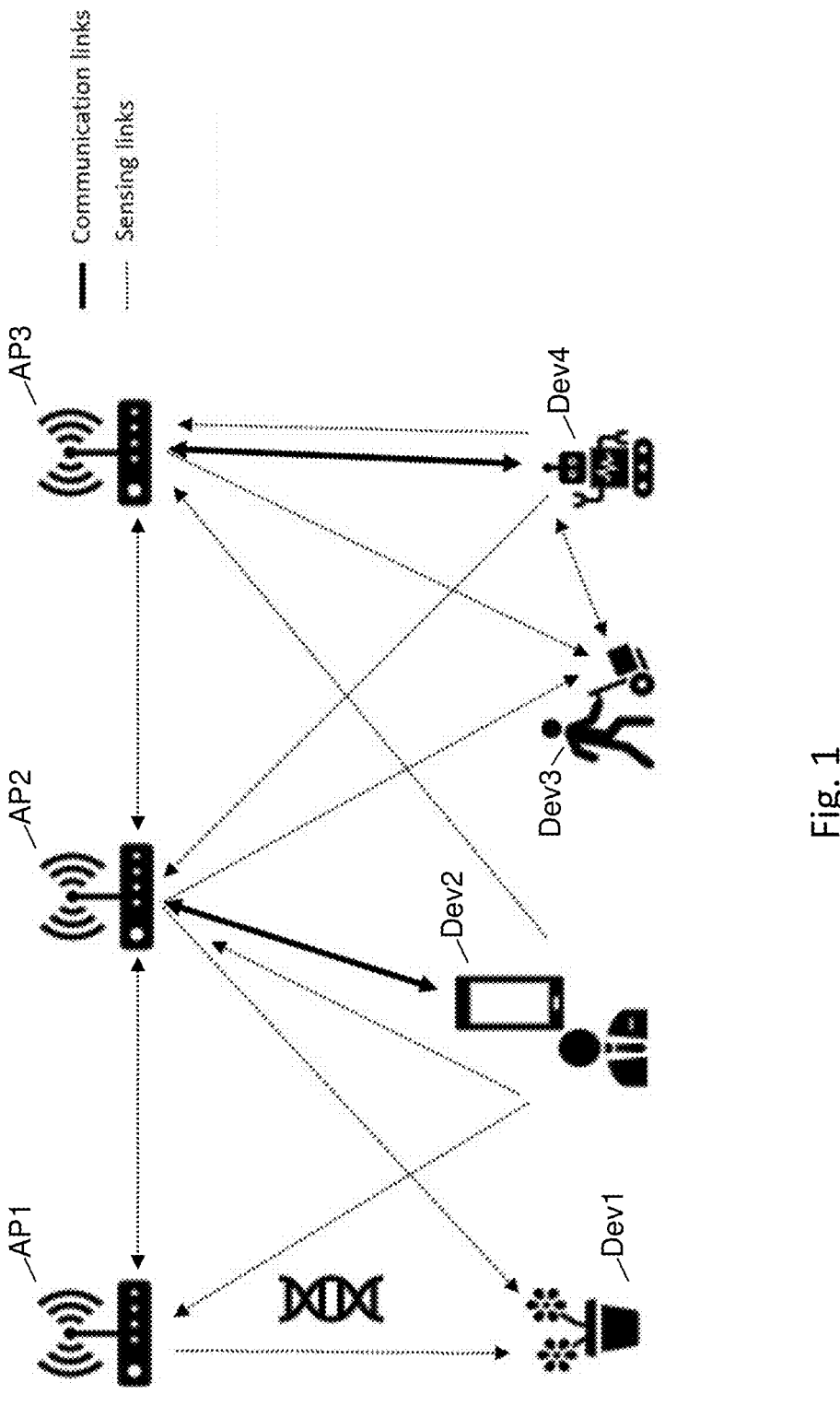
FIG. 1 shows an example of joint communication and sensing operations in future systems of at least some example embodiments.

FIG. 1 shows an example of joint communication and sensing operations in future systems of at least some example embodiments. In the upper part of FIG. 1 some access points AP1, AP2, AP3 are shown, which are an example of e.g., data nodes and/or sensing nodes. It is to be noted that each access point comprises a data communication layer and/or a sensing layer, i.e., each access point may be configured to function as either a data node, or a sensing node, or as both a data node and a sensing node using its respective layer. In the lower part of FIG. 1 some example devices/objects Dev1, Dev2, Dev3, Dev4, which are interested in sensing data, are shown. For instance, Dev1 may represent any type of non-moving device, like e.g. some "smart" flowerpot which may communicate in relation to its flower's available amount of water. Further, Dev2 may represent a user's mobile device, wherein the user may be in any state of mobility, like e.g. be sitting, walking, or driving. Dev3 may represent a package to be delivered, i.e. any communication in relation to movement of goods, wherein Dev4 may represent any type of robot, i.e. any movable apparatus that may move on its own motion. Further, signaling denoted with a solid line in FIG. 1 shows examples of communication links between the example devices/objects and nodes, e.g., communication data nodes, the communication layer of access points, etc. Further, signaling denoted with dotted lines shows sensing links between the example devices/objects and nodes, e.g., sensing nodes, the sensing layer of access points, etc. Also, signaling denoted with the dotted lines between the respective nodes shows sensing links. It shall be noted, however, that information may be interchanged between the respective nodes.

Further, at least some example embodiments allow performing sensing operations in resources that are part of current data channels (e.g., the Physical Uplink Channel (PUSCH) and Physical Downlink Channel (PDSCH) of 5G) of wireless communications, creating new Physical Uplink/Downlink Sensing Shared Channels (PUSeCH/PDSeCH), respectively.

In the following, it is referred to the UL (PUSeCH). However, the disclosed procedure can be applied for DL (PDSeCH) in a similar manner.

According to at least some example embodiments, a Sensing Management Function (SMF) or Location Management Function (LMF) of 5G, will release PUSeCH semi-persistent scheduling (SPS) grants to the SAPs, allowing to establish semi-dynamic allocations of sensing resources where needed. These PUSeCH will occupy resources typically reserved for data communication and their allocations will be efficiently signaled to SAPs. A way to allocate these resources and to efficiently signal the allocation is described below.

According to at least some example embodiments, the SMF, if run in a centralized way, manages PUSeCH allocations of different SAPs, taking care of proper interference avoidance schemes (e.g., blanking), as done for previous reference signals in 5G. Further details are described below.

In at least some example embodiments, one new task of the SMF is to negotiate with the single SAP about the resource availability and the amount of resources that can be allocated to PUSeCH, given each cell load and Quality of Service (QOS) of communication and sensing services. Based on the load, the Sensing Quality of Service (S-QoS) could be adapted, leveraging unused resources. An example of such a procedure is described below.

Then, according to at least some example embodiments, each single SAP (or the LMF controlling it) can assign portions of the PUSeCH allocated to the SAP to each single sensing service with Sensing Channel Grants (SCG), sharing with the interested users/other SAPs information about the sensing granted resources with a format similar the PUSeCH grants (further details are described below).

According to at least some example embodiments, in order to ensure compatibility with UEs/SAP running communication operations, the PUSeCH allocations are shared with these devices. The information is updated when the macro PUSeCH allocations change, thus rarely, and can be either broadcasted or single/multi-casted to the devices in the system with minor overhead. Accordingly, they can easily avoid/ignore those resource elements during transmission/reception in the PUSCH when performing communications.

Figure 2:
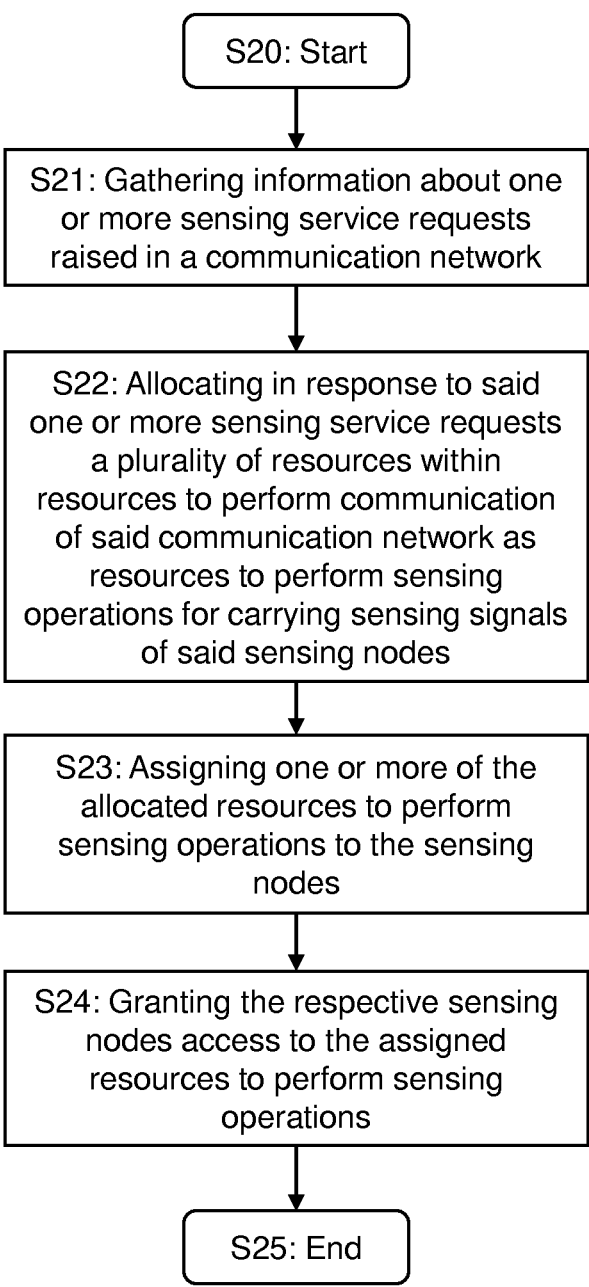
FIG. 2 shows a flowchart illustrating an example method 1 according to at least some embodiments.

In FIG. 2, a method 1 according to at least some example embodiments is illustrated.

The method 1, which starts at step S20, comprises a step S21 of gathering information about one or more sensing service requests raised in a communication network, wherein said communication network comprises sensing and/or data nodes. The method 1 further comprises a step S22 of allocating in response to said one or more sensing service requests a plurality of resources within resources to perform communication of said communication network as resources to perform sensing operations for carrying sensing signals of said sensing nodes. There is further a step S23 of assigning one or more of the allocated resources to perform sensing operations to the sensing nodes. Moreover, the method 1 comprises a step S24 of granting the respective sensing nodes access to the assigned resources to perform sensing operations. The processing end at step S25.

It shall be noted that according to various examples of embodiments, at least several of the steps according to the method 1 may be executable by e.g. such SMF as outlined above.

It shall further be noted that according to various example embodiments, such allocating of a plurality of resources as resources to perform sensing operations comprises allocating at least one (of such above-outlined) PSeCH.

According to at least some example embodiments the method 1 may further comprise, as illustrated in FIG. 3, informing, at step S24a, said sensing and/or data nodes about said granted resources to perform sensing operations; and excluding, at step S24b, those resources to perform sensing operations granted to the sensing nodes from being used as resources to perform communication the data nodes.

According to various example embodiments said resources to perform sensing operations may comprise time and frequency resources, wherein said allocating resources to perform sensing operations is a periodic time/frequency burst, PTFB, allocation. In addition, said allocating is based on a set of parameters comprising a time/frequency index of a first time and frequency resource element of the PTFB, a sampling period in time/frequency and a total aperture in time/frequency. Moreover, said set of parameters optionally further comprises at least one of a start frame index, a start subframe index, a start slot index, a PTFB periodicity, a frequency offset between corresponding frequencies allocated in consecutive time periods, a set of angular indexes used in a resource to perform sensing operations, a maximum transmission power, and a Boolean value indicating an exclusion of a respective PTFB from transmission of any signal. It shall be noted that such exclusion of a respective PTFB from transmission of any signal may be relevant/important to allow for blanking and reducing interference to sensing operations run in other cells, that is e.g. run in a radio area served by another sensing and/or data node.

According to at least some example embodiments said allocating of resources to perform sensing operations may at least be one PTFB defined by the set of parameters. Additionally, and further PTFBs in said allocating of resources to perform sensing operations differ in at least one of the parameters time/frequency index of a first time and frequency resource element of the PTFB and sampling period in time/frequency, and optionally by at least one of the parameters start frame index, start subframe index, start slot index and PTFB periodicity. Further, the one or more PTFBs in said allocating of resources to perform sensing operations are located within PTFBs of a shared channel of the communication network.

According to various example embodiments, the method 1 may further comprise cancelling/releasing at least part of said allocated plurality of resources to perform sensing operations, dependent on a first predetermined condition being met, wherein the first predetermined condition is at least one of a detected reduction of a sensing load in said communication network, and a new resource allocation to be used for performing sensing operations. The method 1 further comprises transmitting cancellation/release information to the sensing and/or data nodes.

It shall be understood that according to various example embodiments, such cancelling/releasing of at least part of said allocated plurality of resources may comprise cancelling/releasing at least one (of such above-outlined) PSeCH.

Optionally, according to at least some example embodiments, the method 1 may further comprise formatting a desired sensing angle field comprising information about a predetermined sensing angle, setting the angular index based on an estimated sensing accuracy, defining beam sets by matching transmitting and receiving beam sets of the sensing nodes, setting beam patterns among different sensing nodes while avoiding interference between sensing nodes, setting on the same time/frequency resource PTFBs among different sensing nodes to orthogonal beam sets, and further optionally deciding to blank angular patterns and to schedule orthogonal angles only on the same communication resource block.

Additionally, according to various example embodiments, the method 1 may further comprise applying the assigning and granting of the resources to perform sensing operations to such PTFBs whose desired sensing angle is matched to a sensing angle of at least one sensing node out of the sensing notes.

Furthermore, according to various example embodiments, the method 1 may further comprise cancelling/releasing said one or more assigned and granted resources to perform sensing operations, dependent on a second predetermined condition being met, wherein the second predetermined condition is at least one of a detected reduction of a sensing load in said communication network, and a new access grant to the respective sensing nodes. The method 1 further comprises transmitting cancellation/release information to the sensing and/or data nodes.

Moreover, according to various example embodiments, the assigning and granting of resources to perform sensing operations may dependent on available resources to perform sensing operations in the communication network.

Furthermore, according to at least some example embodiments, the method 1 may further comprise prioritizing a carrying of signals for sensing operations and of signals for communication by providing the signals for sensing and the signals for communication with a priority value, wherein the resources to perform communication are allocated to the carrying of signals for sensing and of signals for communication dependent on the priority value. It shall be noted that such prioritizing may e.g. affect the SMF's decision of resource allocation/split between communication and sensing (between resources to perform communication and resources to perform sensing operations).

Figure 4:
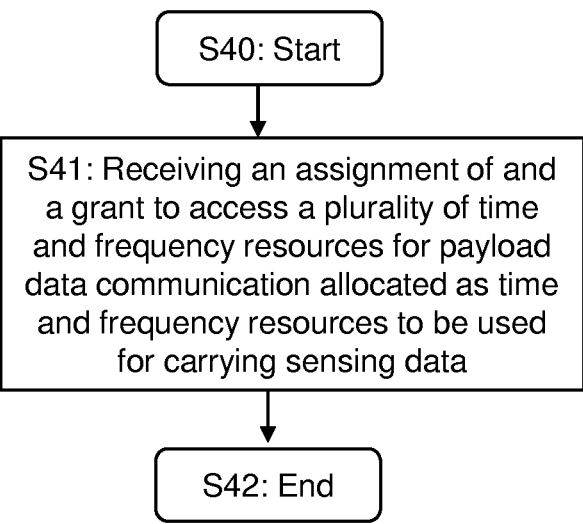
FIG. 4 shows a flowchart illustrating an example method 2 according to at least some embodiments.

In FIG. 4, a method 2 according to at least some example embodiments is illustrated.

The method 2 starts in S40 and comprises a step S41 of receiving, within a communication network comprising sensing and/or data nodes and user terminals, an assignment of and a grant to access a plurality of resources, within resources to perform communication of said communication network, allocated as resources to perform sensing operations for carrying sensing signals. The method 2 ends in step S42.

According to at least some example embodiments the method 2 may further comprise mapping the granted resources to perform sensing operations to resources to perform communication used by at least one of the user terminals. The method 2 further comprises informing the at least one of the user terminals of respective allocated granted resources to perform sensing operations that are allocated to the at least one of the user terminals. The informing causes the respective allocated granted resources to perform sensing operations to be not available for usage as resources to perform communication for the at least one of the user terminals.

According to various example embodiments the method 2 may further comprise leaving out the granted resources to perform sensing operations for usage as resources to perform communication.

Moreover, according to at least some example embodiments the method 2 may further comprise receiving cancellation/release information indicating an update in the granted resources to perform sensing operations; and informing the at least one of the user terminals of respective updated allocated granted resources to perform sensing operations that are allocated to the at least one of the user terminals based on the received cancellation/release information and/or updating the granted resources to perform sensing operations for usage as resources to perform communication based on the received cancellation/release information.

In the above with reference to method 1 and method 2 some general aspects of at least some example embodiments were presented. In the following more detailed example embodiments are described. With respect to FIG. 5 an example of PSeCH allocation in a generic 7-symbols slot and 12 subcarriers in the first PRB of the carrier on slot index x is shown.

Figure 5:
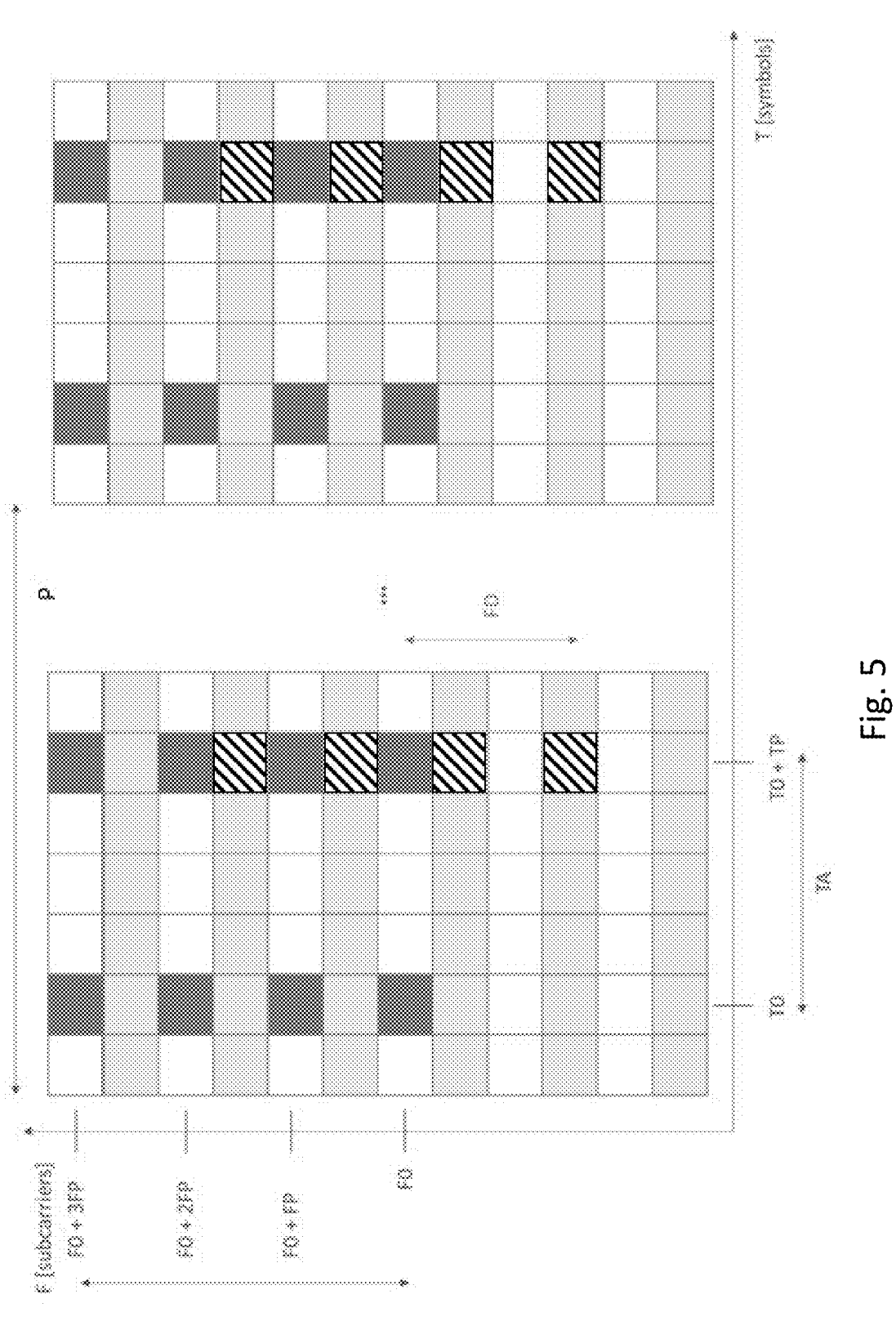
FIG. 5 shows an example Physical Sensing Channel (PSeCH) allocation in a generic 7-symbols slot and 12 subcarriers in a first PRB of the carrier on slot index x.

In FIG. 5, the abscissa denotes a time in symbols, and the ordinate denotes a frequency in terms of the respective subcarriers. In the example shown in FIG. 5, the parameters are F0=(PRB=1, SC=6), T0=(SB=x, Sym=2), FP=2, TP=4, FA=4, TS=2, Period=P, FD=0, wherein "SC" denotes a subcarrier, "SB" denotes subframe, "Sym" denotes Symbol, "FP" denotes frequency sampling period, "TP" denotes time sampling period, "FA" denotes frequency aperture, "TS" denotes time slot, and "FD" denotes frequency distance. That is, in the first PRB shown in FIG. 5 the dark grey boxes are allocated. However, if FD=−3 applies, the crosshatched boxes would be allocated in the $2^{nd}$ allocation in the PRB instead of the dark grey ones at time T0+TP+k*Period, where k is a natural number or zero.

According to at least some further detailed example embodiments, the following general steps are performed for solving the underlying problem.

1. PUSeCH/PDSeCH is instantiated within the PDSCH/PUSCH with SPS, thereby providing an interference avoidance system with a centralized solution, allowing for PSeCH allocations that should be blanked.

2. Allocating sensing operations with SCGs over the PSeCH (i.e. PUSeCH/PDSeCH) channel.

3. PSeCH negotiation with a resource manager (centralized) or access points (distributed). It shall be understood that the resource manager is centralized. It shall further be noted that access points approach can be distributed (e.g. each assess point operates per-se) or that an access point can have the resource manager functionality integrated (thus, the access point will be a sort of "master"/"master access point").

4. Sharing PSeCH information in the network in order to avoid collision with PDSCH/PUSCH from APs and UEs.

PSeCH Instantiation Within the PDSCH/PUSCH with SPS

Generally, sensing operations performance depend on aperture and sampling period as follows Higher Frequency aperture/period leads to range increased resolution/reduced aliasing Higher time aperture/period leads to Doppler increased resolution/reduced aliasing Higher number of sub-array elements leads to angular increased resolution/reduced aliasing. As communication as well as sensing networks use high angular aperture to spatially multiplex devices/sensing information, at least some example embodiments focus only on the use case of using the whole array).

For sensing operations a structure similar to the dark grey allocations in FIG. 4 is considered in at least some example embodiments.

Further, considering only the frequency domain, it is intended to increase the frequency aperture (FA) as much as possible to improve range resolution, keeping a frequency sampling period (FP) as large as possible, but without risking an incurring in range aliasing. For the time domain the discussion is similar, but where Doppler is estimated instead of range. Such periodic 2D allocations are best suited for running sensing operations, guaranteeing both regular aliasing and resolution performance. The approach also generalizes if only a single dimension among range or Doppler is considered. For instance, with range estimation only, infinite (thus useless) resolution can be set in the Doppler domain, ending up in a single symbol burst in the time domain (null aperture).

Such periodic time/frequency burst (PTFB) allocations can be reserved for each single SAP in the PUSCH (similar discussions hold for PDSCH) with light signaling. These are not the allocations to a single sensing service but will rather consist of the aggregate of the resources available for sensing for the operations concerning each single SAP. SCGs assigning PTFBs to each service will be described below with respect to some further example embodiments.

Given the periodic updates of sensing operations, at least some example embodiments semi-persistent schedule each PTFB with the following parameters:

Frame index Start, (potentially listable)

Subframe and/or slot index start, (listable)

PTFB periodicity (in subframes/slots), (potentially listable)

T0/F0: the time/frequency index of the first resource element of the PTFB, (listable)

TP/FP: the sampling period in time/frequency, (listable)

TA/FA: the total aperture in time/frequency (number of RE (resource element) or absolute value), FD (optional): the frequency distance between corresponding frequencies allocated in consecutive time periods.

Desired angle (optional): the set of angles that can be used in the sensing resource.

Blanked: Boolean value signaling that the PTFB is not to be used for transmission of any signal (but will be likely used by in some other cells to avoid interference).

Maximum transmit power (optional): limiting the transmit power to be used, in order to control interference. If not present, the maximum allowed (by hardware and other procedures, e.g. power control) would be used.

It is to be noted that the first three parameters could be signaled in a way similar to current SPS (or configured grants in UL) allocations of communications services according to at least some example embodiments.

With FIG. 4 an example embodiment of the impact of few of these parameters (the novel ones not related to SPS) is shown. PTFB allocations can contain a SAP's PUSeCH that is granted by the SMF.

However, it is to be noted that not all parameter choices are possible, due to the already occupied resource elements by channels that are not the PUSCH. Thus, in at least some example embodiments, the SMF should take care of avoiding these collisions with the PUSeCH allocations by selecting allocations that are only belonging to the PUSCH.

Further, according to at least some example embodiments, a way to resolve remaining conflicts could be that if a PUSeCH allocation is trying to access resources not belonging to the PUSCH, these resources will be skipped and not assigned to the PUSeCH.

In at least some example embodiments, a list of PTFB may be allocated to the PUSeCH (to serve multiple sensing requests) by Configuring a list of PTFB with the parameters shown above, and/or Configuring a set of PTFB, by associating a list of values to the (listable) parameters shown above. The resulting PUSeCH will be the set of PTFB, consisting of each single PTFB obtained by sweeping over each combination of parameters in each list. For instance, if T0={t, t+1}, a set of two PTFB will be obtained, the second being exactly at the same position of the first, but delayed by 1 OFDM symbol.

In addition, in at least some example embodiments, each of the PUSeCH allocated to the SAP that are not blanked could have associated an ID_PUSeCH and, within a single PUSeCH, each PTFB will have its ID_PTFB.

These PUSeCH allocations are done by the SMF residing in a central entity, hence managing multiple communication cells or in a distributed single-cell entity. It is further to be noted that in 6G the presence of many subnetworks within macro-cells is envisioned. Therefore, in at least some example embodiments, a single cell could still manage multiple JCAS SAP.

Accordingly, in at least some example embodiments, the SMF could decide to send PUSeCH allocations with blanked PTFB to each single SAP. In this case, a SAP will not allocate sensing nor communication operations in the resource elements corresponding to the blanked PUSeCH allocations, allowing to reduce interference among neighboring entities performing sensing operations.

Further, according to at least some example embodiments, PUSeCH/PDSeCH allocations could be canceled/released with ad-hoc messages from SMF to SAPs, when sensing load is reducing or new allocations are being shared by the SMF.

According to at least some other example embodiments, the optional field for assigning the correct angles to the beams is important, as in future networks spatial multiplex is required for connecting the manifold of devices.

Thus, to allow the sensing operations to be most efficient, the PTFB could contain not only one index but a list of possible angles in sensing operations, corresponding to the SAP's angle of departures/arrivals. It is to be noted that the beam directions should be orthogonal to the ones configured in neighboring SAPs to mitigate interference.

For determining the correct list, three different beamforming methods will be considered: (1) full digital beamforming, (2) hybrid beamforming, (3) analog beamforming.

All those create unique challenges on how to schedule the angular domain efficiently, which may require a method not focused on/not covered by the present specification.

Using the information of the angular pattern and its corresponding interference, the SMF (assuming the case that the SMF has such information) performs the following procedure in at least some example embodiments setting the angular index occurrence based on the estimated sensing accuracy, setting the angular index in a periodic fashion depending on the periodicity of the sensing request, defining, the correct beam sets available, matching the TX and RX beam sets, setting angular patterns among different SAPs such that they do not interfere each other, setting on the same time/frequency resource the PTFB among different SAPs/APs to orthogonal beam sets, (optional) blanking angular patterns creating interference for the sensing or communication network, (optional) scheduling orthogonal angles only on the same communication resource block. It shall be noted that orthogonal means that the angles and the transmitter entities are arranged/configured such that the energy of the transmissions is spatially separated (for instance and for explanation purposes only, if the same cell transmits signal A on its left and signal B on its right, they are orthogonal).

Allocating Sensing Operations with SCGs Over the PUSeCH/PDSeCH Channel

Once the PUSeCH(/PDSeCH) have been allocated with the procedure described above, its sensing resources (if not blanked) can be assigned with a SCG in at least some example embodiments. Given the desirable PTFB shape of sensing services, resources to sensing operations can be granted by communicating a semi-persistent SCG corresponding to a PTFB allocation, according to the signaling described above. The SMF uses the list of allocations, where the angles between a TX and RX sensing network are matched in a PTFB, to sort for the best possible way to use the available SCG or adding a new PTFB to the scheduling. The SMF will select per SCG the correct PTFBs where the required angular can be swept using the allowed slot beam list. However, it shall be noted that a selection of the correct PTFBs can in general also be done by the single SAP.

Further, it is likely that the PTFB of SCG should not contain any listable parameters (single PTFB). In order to configure beam sweeps, if beamforming is to be used, then one can have listable parameters (apart from the desired angle, but associated another set of angular indexes, where each PTFB has a single angular index.

In at least some example embodiments, another option could be to simply communicate the ID_PUSeCH, ID_PTFB and then signal parameters like the PTFB allocation of the previous subsection, but already considering the restricted amount of resources belonging to the selected PTFB.

It is to be noted that for PUSeCH, the granted resources assume the shape of a configured grant (while in DL of a SPS allocation), whose shape is tailored for sensing operations. The SCG, containing the granted sensing resources, is sent to the terminal that must transmit the sensing signal. The discussion about the scheduling of the sensing operations and the available sensing resources to the entities requiring them will be described below.

Further, in at least some example embodiments, SCGs could be canceled/released with ad-hoc messages from the SMF to the interested terminals, when a sensing load is reducing or a new grant is being configured by the SMF for the same service.

It is to be noted that given the PTFB generic shape, SCGs could be used also to grant resources to sensing operations not only on PUSeCH(/PDSeCH), but also on other resource elements (for instant on resources typically reserved for reference signals, e.g. PRS). However, the signal fields should be slightly adapted, to cope with the other physical channel allocation, but this can be done in a trivial way.

In addition, handling different load scenarios, the SMF could adapt the performance of sensing services based on the load of sensing services and the amount of resources available for performing sensing in at least some example embodiments. For instance, in a low load scenario high update rate in the angular sweep (using all available angles) and setting the FP to 1 (use full resources for sensing) and in a high load scenario scarcely schedule the angles required to fulfill the sensing requests. SCG could also be scheduled in a way where a full beam search is created by joining the number of angles PTFBs into multiple time resources. This can be useful, e.g. for synchronization or initialization of sensing setups.

Moreover, in at least some example embodiments, the PTFB allocations to single services could be refined in time. For instance, as the estimated scenario is scanned, its digital twin assumes a constantly increased precision. Therefore, reducing resources to scan known areas or locate known objects, for instance by reducing the unambiguous range (thus increasing FP that results in less sensing resources needed) may be considered. On the other hand, free resources can be used for more critical services, whose confidence is getting worse.

Sensing Resource Negotiation with a Communication Resource Manager

In JCAS systems, once the load of shared resources becomes problematic due to the high communication and/or sensing resource requirements, the system manager should start making decisions about what to allocate and to whom. In the procedure according to at least some example embodiments, shown in FIG. 5, it is assumed that this decision is done in the SMF. However, in some other embodiments, it can be in principle assigned to other network components with similar procedures. It is to be noted that also in this case the coordinating SMF could be centralized, hence operating across multiple cells. On the other hand, it could be distributed, losing the ability to synchronize operations (controlling interference as one of the benefits) across multiple cells.

As mentioned above, FIG. 6 shows an example flowchart for assigning shared resources to communications/sensing in a JCAS system.

In step S600, the Layer 2 (L2) of each controlled cell estimates the amount of required resources that it needs to run communication operations. Resource needs can be for instance represented in terms of amount of symbols/s (number of resource elements per second) needed.

Since this procedure should solve the conflict among communications/sensing services with different priorities, the amount of resources needed for each priority class/index/type—hereafter class—is needed. It is to be noted that it could also happen that sensing services have higher/lower priority than communication services (data radio bearers and/or logical channels) from the same devices. In at least some example embodiments, the priority class can be represented by an enumeration type. An example could be > Priority 1: Urgent/Non-negotiable QoS services (e.g. delay critical GBR of 5G).
> Priority 2: High priority QoS services (e.g. GBR of 5G).
> Priority 3: Low priority QoS services (e.g. nonGBR of 5G with rate/latency guarantees).
> Priority 4: Best effort (e.g. nonGBR of 5G with rate/latency guarantees).
> Many factors, like Allocation and Retention Priority (ARP), could be considered to choose the priority, although they are not object of this application.

In at least some example embodiments, the SMF can configure the priority splitting to all entities in the system. Then, in step S601, the L2 can share the information about how many resources are needed for every priority index.

Further, in step S602, while the system runs, the SMF gathers information about every sensing service request with some associated QoS information. Then, in step S603, the SMF associates a priority index to each request and allocates its resources in order of priority to communications and sensing priority classes, until the resources are exhausted, or all priority classes are served. This is done by estimating the required PTFB allocations for every cell and SAP to satisfy the sensing service requests while they are allocated.

Then, in step S604, the SMF allocates PSeCH(i.e. PUSeCH/PDSeCH) to each managed SAPs containing enough resources for sensing to allocate sensing service grants to all sensing services that have been accepted in the previous step. Accordingly, SCGs are sent to the terminals (e.g., other SAPs, UEs) that must perform sensing operations. It is to be noted that with this procedure, the SMF could also make use of available resources for sensing in other physical channels, if there are any. For instance, if PRS could be used for sensing, some sensing operations could be allocated to it, reducing the need of resources over the PDSeCH.

In step S605, the SAPs can then take into account the PSeCH allocations to avoid these resources for communications.

Figure 6:
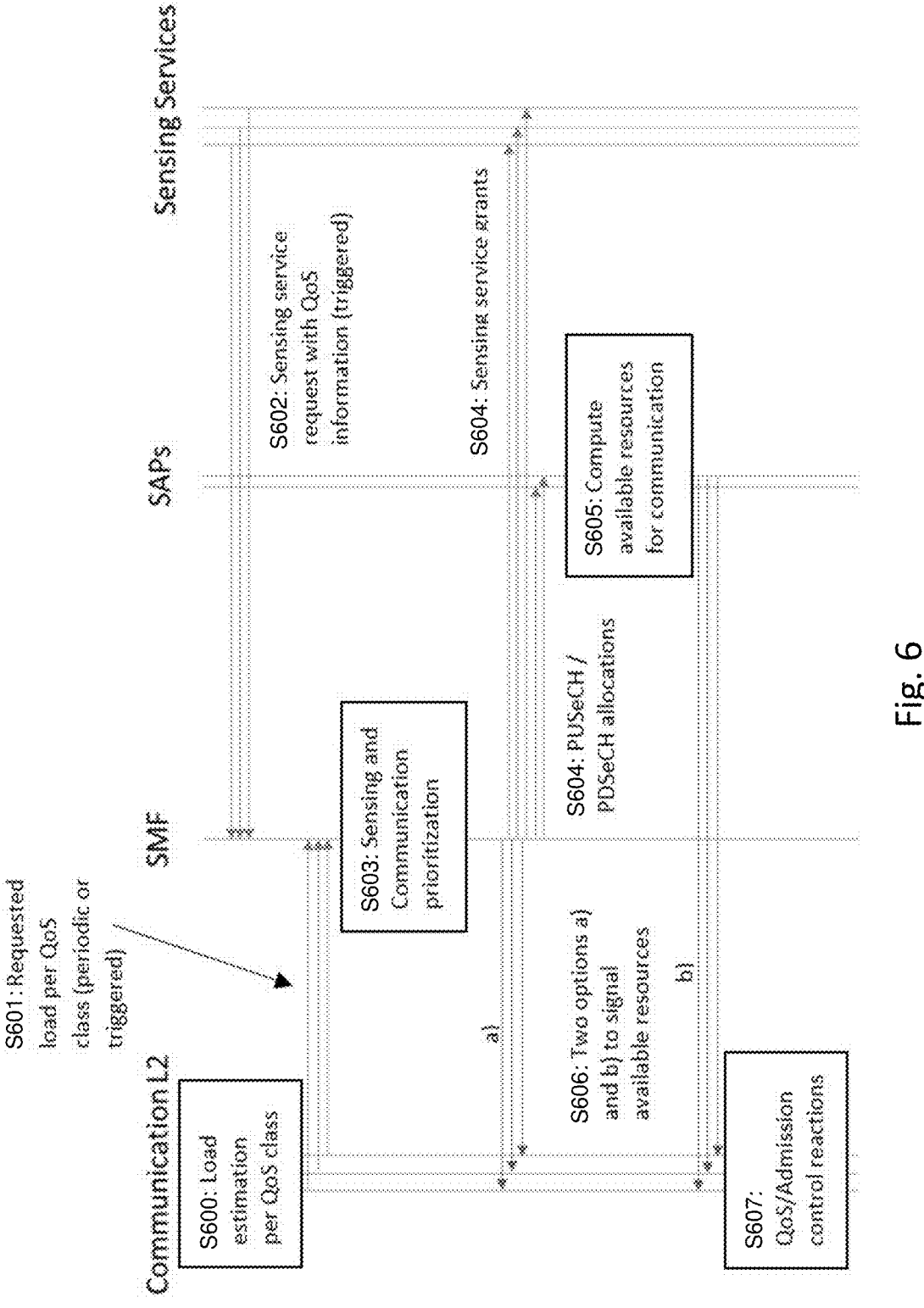
FIG. 6 shows an example flowchart for assigning shared resources to communications/sensing in a JCAS system.

Further, in step S606, which is optionally, the allocated load for every priority class could be shared back by the SMF or the SAP controlling the cell to the Communication L2 entity (representing options a) and b) in FIG. 6). This could allow to trigger admission/congestion control procedures in step S607, if some low priority services could not be served. On the other hand, if resources for communication increase, these procedures could start accepting/serving low-priority services again.

In some example embodiments, the procedure depicted in FIG. 6 could run periodically, allowing to adapt the PSeCH allocation to the current sensing demand on the system. Moreover, to stabilize these allocations, the procedure could also overprovision resources allocated for sensing operations, allowing to accept new sensing services without the need of frequent updates.

Sharing PSeCH Allocations to the Network, Avoiding Collisions with PDSCH/PUSCH At least some example embodiments ensure that minimal changes in communication systems are required to handle this communication and sensing multiplexing over the shared channels.

Thus, in at least some example embodiments, the communication layer of the SAP (or, simply, AP since now only communications are considered) and of the communication devices is warned about the fact that not all resources in the PUSCH/PDSCH are used for communications. This is necessary to, e.g., > avoid transmitting over them if a PRB of time-frequency resources for communications collides with a PSeCH,
> discard received resource elements containing PSeCH (thus not communication payload) before decoding them.

In both these operations, the resource element mapping should be aware of the ongoing PSeCH. On the SAP side, this information can be communicated with an ad-hoc protocol between the SMF taking care of the PSeCH allocations and the SAP.

On the other hand, in at least some example embodiments, each SAP coordinating a communication cell should inform every device of the PSeCH allocations in their active bandwidth. It is to be noted that that devices may operate in subsets of bandwidth, thus each device does not need the full information about PSeCH. Therefore, broadcast/multi-cast/single-cast signaling messages between the SAP and the users could be defined, carrying the semi-persistent scheduling allocations of PSeCH.

It is to be further noted that since PSeCH will be likely updated every tenths of seconds/minutes, the overhead needed in the control channel from base stations to users is minimal. Moreover, it is to be noted that the length of a message carrying the PSeCH (i.e. PUSeCH/PDSeCH) is variable, but it should be between in the order of few hundreds bits, like e.g. 200-300 bits. This estimate was done including many listable parameters for each listable field, assuming 8 bit fields, but some of them can be easily represented by 4 bits.

It is to be noted that according to at least some example embodiments, PSeCH (i.e. PUSeCH/PDSeCH) allocations without telling UEs to blank resources are possible. This can be done with either radar applications (leveraging known transmitted data symbols) and/or spatial multiplexing of sensing services and communication services.

However, since this would impact too much the complexity of current communication operations and since at least some example embodiments enable scalable sensing services without impacting too much the complexity of current communication operations, these options are not considered in this application.

Figure 7:
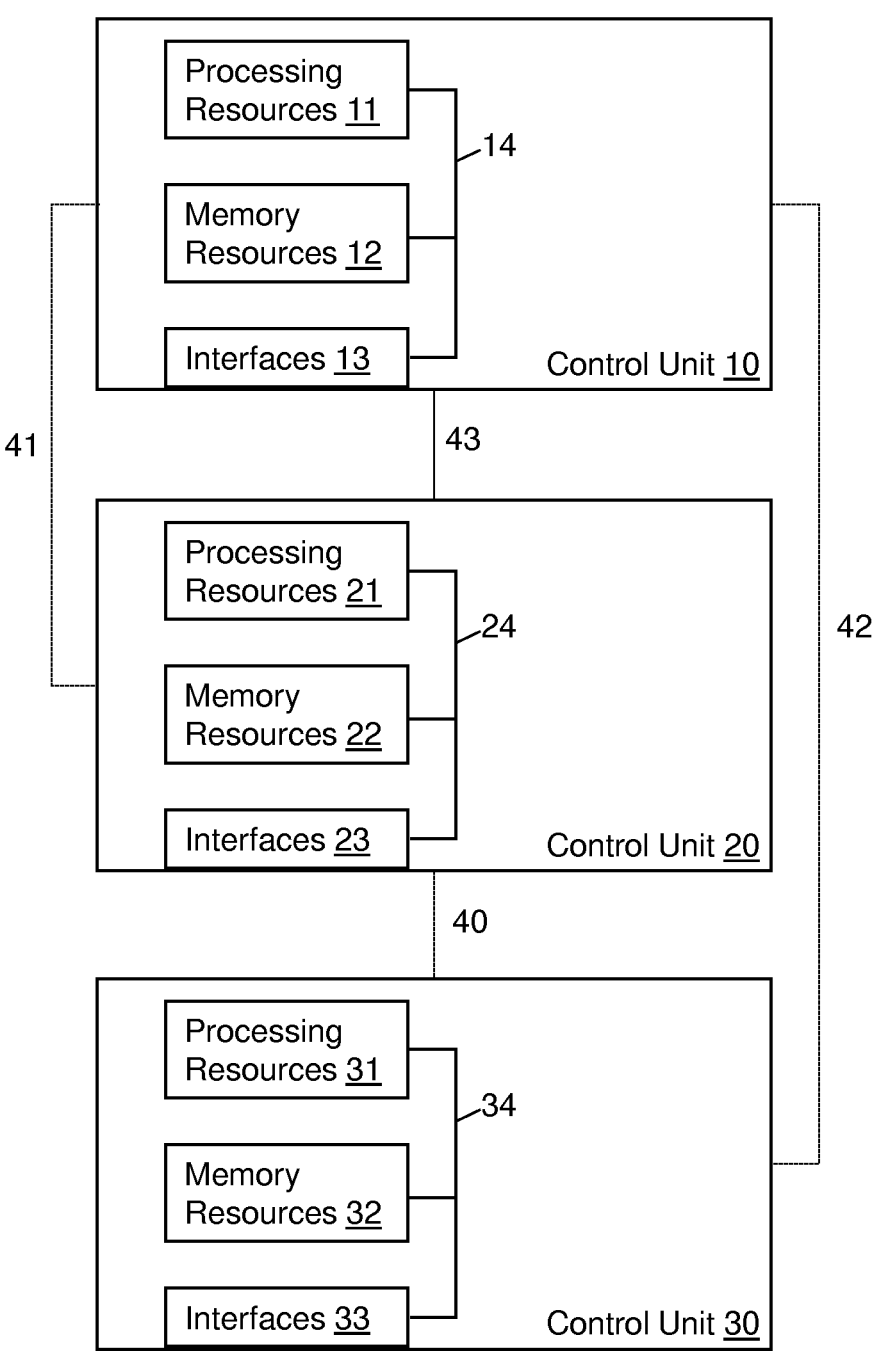
FIG. 7 shows a schematic block diagram illustrating a configuration of control units in which at least some example embodiments are implementable.

Lastly, FIG. 7 depicts control units 10, 20, and 30, each comprising processing resources (e.g. processing circuitry) 11, 21, 31, memory resources (e.g. memory circuitry) 12, 22, 32 and interfaces (e.g. interface circuitry) 13, 23, 33. In at least one exemplary embodiment, the control unit 10 is configured to be implemented in and/or used by a management function, e.g. sensing management function or local management function as described above, the control unit 20 20 is configured to be implemented in and/or used by a sensing node, e.g. sensing layer of an access point as described above, and the control unit 30 is configured to be implemented in and/or used by a device interested in sensing information, e.g., a user terminal/another sensing node as described above. Further, each control unit has an own bus system 14, 24, 34 which connects the aforementioned resources such that data can be exchanged between the three components of a unit. In addition, control units 10 and 20 and 30 can be connected wirelessly via links 40, 41 and 42. Moreover, control units 10 and 20 may have an additional Xn interface 43, which enables a connection between the respective units and their resources.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The definitions indicated in the present description are based on the current 3GPP standards. However, they are not limiting. Other definitions according to the same or a corresponding concept are applicable to some example embodiments, too.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be embodied in the cloud.

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof.

Further, as used in this application, the term "circuitry" refers to one or more or all of the following:

(a) hardware-only circuit implementations (such as implementations in only analog and/or digital circuitry) and (b) to combinations of circuits and software (and/or firmware), such as (as applicable):

(i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

According to at least some example embodiments, an apparatus 1 is provided, which may represent e.g. such SMF as outlined above and which may execute e.g. such method 1 and/or at least several steps thereof, as outlined above with reference to FIG. 2. The apparatus 1 comprises gathering means for gathering information about one or more sensing service requests raised in a communication network, wherein said communication network comprises sensing and/or data nodes. The apparatus 1 further comprises allocating means for allocating in response to said one or more sensing service requests a plurality of resources within resources to perform communication of said communication network as resources to perform sensing operations for carrying sensing signals of said sensing nodes. Moreover, the apparatus 1 comprises assigning means for assigning one or more of the allocated resources to perform sensing operations to the sensing nodes, and granting means for granting the respective sensing nodes access to the assigned resources to perform sensing operations.

It shall further be noted that according to various example embodiments, such allocating of a plurality of resources as resources to perform sensing operations comprises allocating at least one (of such above-outlined) PSeCH.

Moreover, according to various example embodiments, the apparatus 1 may further comprise informing means for informing said sensing and/or data nodes about said granted resources to perform sensing operations; and excluding means foe excluding those resources to perform sensing operations granted to the sensing nodes from being used as resources to perform communication the data nodes.

Moreover, according to at least some example embodiments, said resources to perform sensing operations may comprise time and frequency resources, wherein said allocating resources to perform sensing operations is a periodic time/frequency burst, PTFB, allocation, and wherein said allocating may be based on a set of parameters comprising a time/frequency index of a first time and frequency resource element of the PTFB, a sampling period in time/frequency and a total aperture in time/frequency. Said set of parameters optionally further comprises at least one of a start frame index, a start subframe index, a start slot index, a PTFB periodicity, a frequency offset between corresponding frequencies allocated in consecutive time periods, a set of angular indexes used in a resource to perform sensing operations, a maximum transmission power, and a Boolean value indicating an exclusion of a respective PTFB from transmission of any signal.

Furthermore, according to various example embodiments, said allocating of resources to perform sensing operations may at least be one PTFB defined by the set of parameters, and wherein further PTFBs in said allocating of resources to perform sensing operations differ in at least one of the parameters time/frequency index of a first time and frequency resource element of the PTFB and sampling period in time/frequency, and optionally by at least one of the parameters start frame index, start subframe index, start slot index and PTFB periodicity. Wherein the one or more PTFBs in said allocating of resources to perform sensing operations may be located within PTFBs of a shared channel of the communication network.

Furthermore, according to various example embodiments, the apparatus 1 may further comprise cancelling/releasing means for cancelling/releasing at least part of said allocated plurality of resources to perform sensing operations, dependent on a first predetermined condition being met, wherein the first predetermined condition is at least one of a detected reduction of a sensing load in said communication network, and a new resource allocation to be used for performing sensing operations. The apparatus 1 further comprises transmitting means for transmitting cancellation/release information to the sensing and/or data nodes.

It shall be understood that according to various example embodiments, such cancelling/releasing of at least part of said allocated plurality of resources may comprise cancelling/releasing at least one (of such above-outlined) PSeCH.

Furthermore, according to at least some example embodiments, the apparatus 1 may further comprise formatting means for formatting a desired sensing angle field comprising information about a predetermined sensing angle, setting means for setting the angular index based on an estimated sensing accuracy, and defining means for defining beam sets by matching transmitting and receiving beam sets of the sensing nodes. In addition, the apparatus 1 further comprises setting means for setting beam patterns among different sensing nodes while avoiding interference between sensing nodes, setting means for setting on the same time/frequency resource PTFBs among different sensing nodes to orthogonal beam sets, and optionally deciding means for deciding to blank angular patterns and to schedule orthogonal angles only on the same communication resource block.

Optionally, according to at least some example embodiments, the apparatus 1 may further comprise applying means for applying the assignment and grant of the resources to perform sensing operations to such PTFBs whose desired sensing angle is matched to a sensing angle of at least one sensing node out of the sensing notes.

Further, according to at least some example embodiments, the apparatus 1 may further comprise cancelling/releasing means for cancelling/releasing said one or more assigned and granted resources to perform sensing operations, dependent on a second predetermined condition being met, wherein the second predetermined condition is at least one of a detected reduction of a sensing load in said communication network, and a new access grant to the respective sensing nodes. The apparatus 1 further comprises transmitting means for transmitting cancellation/release information to the sensing and/or data nodes.

Furthermore, according to various example embodiments, the apparatus 1 may further comprise performing means for performing said assigning and granting of resources to perform sensing operations dependent on available resources to perform sensing operations in the communication network.

Optionally, according to various example embodiments, the apparatus 1 may further comprise prioritizing means for prioritizing a carrying of signals for sensing operations and of signals for communication by providing the signals for sensing and the signals for communication with a priority value, wherein the resources to perform communication are allocated to the carrying of signals for sensing and of signals for communication dependent on the priority value.

According to at least some example embodiments, an apparatus 2 is provided, which may represent e.g. such SAP as outlined above and which may execute e.g. such method 2 and/or at least several steps thereof, as outlined above with reference to FIG. 3. The apparatus 2 comprises receiving means for receiving, within a communication network comprising sensing and/or data nodes and user terminals, an assignment of and a grant to access a plurality of resources, within resources to perform communication of said communication network, allocated as resources to perform sensing operations for carrying sensing signals.

Optionally, according to various example embodiments, the apparatus 2 may further comprise mapping means for mapping the granted resources to perform sensing operations to resources to perform communication used by at least one of the user terminals; and informing means fir informing the at least one of the user terminals of respective allocated granted resources to perform sensing operations that are allocated to the at least one of the user terminals. It shall be noted that said informing causes the respective allocated granted resources to perform sensing operations to be not available for usage as resources to perform communication for the at least one of the user terminals.

Moreover, according to at least some example embodiments, the apparatus 2 may further comprise leaving out means for leaving out the granted resources to perform sensing operations for usage as resources to perform communication.

Furthermore, according to various example embodiments, the apparatus 2 may further comprise receiving means for receiving cancellation/release information indicating an update in the granted resources to perform sensing operations; and informing means for informing the at least one of the user terminals of respective updated allocated granted resources to perform sensing operations that are allocated to the at least one of the user terminals based on the received cancellation/release information and/or updating means for updating the granted resources to perform sensing operations for usage as resources to perform communication based on the received cancellation/release information.

Further, according to at least some example embodiments, there may be provided a computer program product for a computer, including software code portions for performing the steps of any of the above-outlined method 1 and/or method 2, when said product is run on the computer.

Optionally, according to various example embodiments, the computer program product may include a computer-readable medium on which said software code portions are stored, and/or the computer program product may be directly loadable into the internal memory of the computer and/or may be transmittable via a network by means of at least one of upload, download and push procedures.

It is to be understood that what is described above is what is presently considered the preferred example embodiments of the present specification. However, it should be noted that the description of the preferred example embodiments is given by way of example only and that various modifications may be made without departing from the scope of the specification as defined by the appended claims.

What is claimed is:

1. An apparatus comprising:

at least one processor; and at least one memory storing instructions that, when executed by the at least one processor, cause the apparatus at least to:

gather information about one or more sensing service requests raised in a communication network, wherein said communication network comprises sensing nodes and data nodes;

allocate in response to said one or more sensing service requests a plurality of resources from within resources to perform communication of said communication network as resources to perform sensing operations for carrying sensing signals of said sensing nodes;

assign one or more of the allocated plurality of resources to perform sensing operations to the sensing nodes;

grant respective sensing nodes access to the assigned one or more resources to perform sensing operations;

inform said sensing nodes and data nodes about said granted resources to perform sensing operations;

exclude those resources to perform sensing operations granted to the sensing nodes from being used as resources to perform communication by the data nodes, in order to avoid transmitting communications by the data nodes over said granted resources to perform sensing operations;

cancel/release at least part of said allocated plurality of resources to perform sensing operations, dependent on a first predetermined condition being met, wherein the first predetermined condition is at least one of a detected reduction of a sensing load in said communication network or a new resource allocation to be used for performing sensing operations; and transmit cancellation/release information to the sensing nodes, data nodes, or both sending and data nodes.

2. The apparatus of claim 1, wherein said resources to perform sensing operations comprise time and frequency resources;

wherein said allocating the plurality of resources to perform sensing operations is a periodic time/frequency burst (PTFB) allocation;

wherein said allocating is based on a set of parameters comprising one or more of a time/frequency index of a first time and frequency resource element of the PTFB, a sampling period in time/frequency, or a total aperture in time/frequency; and wherein said set of parameters further comprises at least one of the following:

a start frame index;

a start subframe index;

a start slot index;

a PTFB periodicity;

a frequency offset between corresponding frequencies allocated in consecutive time periods;

a set of angular indexes used in a resource to perform sensing operations, a maximum transmission power; or a Boolean value indicating an exclusion of a respective PTFB from transmission of any signal.

3. The apparatus according to claim 1, wherein said allocating of the plurality of resources to perform sensing operations is at least one PTFB defined by a set of parameters; and wherein further PTFBs in said allocating of the plurality of resources to perform sensing operations differ in at least one of: a time/frequency index of a first time and frequency resource element of the PTFB, or a sampling period in time/frequency; and wherein the at least one PTFB in said allocating of the plurality of resources to perform sensing operations are located within PTFBs of a shared channel of the communication network.

4. The apparatus according to claim 3, wherein the further PTFBs in said allocating of the plurality of resources to perform sensing operations further differ in at least one of:

start frame index;

start subframe index;

start slot index; or

PTFB periodicity.

5. The apparatus according to claim 1, wherein said at least one processor; and said at least one memory storing instructions that, when executed by the at least one processor, further cause the apparatus at least to:

format a desired angle field comprising information about predetermined sensing angles, set the angular index based on an estimated sensing accuracy, defining beam sets by matching transmitting and receiving beam sets of the sensing nodes, set beam patterns among different sensing nodes while avoiding interference between sensing nodes;

set, on the same time/frequency resource, periodic time/frequency bursts (PTFBs) among different sensing nodes to orthogonal beam sets; and decide to blank angular patterns and to schedule orthogonal angles only on a same communication resource block.

6. The apparatus according to claim 1, wherein said at least one memory stores instructions that, when executed by the at least one processor, further cause the apparatus at least to:

apply the assigning and granting to perform sensing operations to such periodic time/frequency bursts (PTFBs) whose desired angle is matched to a sensing angle of at least one sensing node out of the sensing nodes.

7. The apparatus according to claim 1, wherein said at least one memory stores instructions that, when executed by the at least one processor, further cause the apparatus at least to:

cancel/release said one or more assigned and granted resources to perform sensing operations, dependent on a second predetermined condition being met, wherein the second predetermined condition is at least one of a detected reduction of a sensing load in said communication network, and a new access grant to the respective sensing nodes; and transmit cancellation/release information to the sensing nodes and data nodes.

8. The apparatus according to claim 1, wherein said at least one memory stores instructions that, when executed by the at least one processor, further cause the apparatus at least to:

prioritize a carrying of signals for sensing operations and of signals for communication by providing the signals for sensing and the signals for communication with a priority value, wherein the resources to perform communication are allocated to the carrying of signals for sensing and of signals for communication dependent on the priority value.

9. An apparatus comprising:

at least one processor; and at least one memory storing instructions that, when executed by the at least one processor, cause the apparatus at least to:

receive, within a communication network comprising sensing nodes and data nodes and user terminals, an assignment of and a grant to access a plurality of resources, from within resources to perform communication of said communication network, allocated as granted resources to perform sensing operations for carrying sensing signals;

map the allocated granted resources to perform sensing operations to resources to perform communication used by at least one of the user terminals;

inform the at least one of the user terminals of respective allocated granted resources to perform sensing operations that are allocated to the at least one of the user terminals, wherein the informing causes the respective allocated granted resources to perform sensing operations to be not available for usage as resources to perform communication for the at least one of the user terminals, in order to avoid transmitting communications by the at least one of the user terminals over the respective allocated granted resources to perform sensing operations;

receive cancellation/release information indicating an update in the allocated granted resources to perform sensing operations, wherein the cancellation/release information indicating an update in the allocated granted resources to perform sensing operations is dependent on a first predetermined condition being met, and wherein the first predetermined condition is at least one of a detected reduction of a sensing load in said communication network, or a new resource allocation to be used for performing sensing operations; and consider the allocated granted resources to perform sensing operations based on the received cancellation/release information.

10. The apparatus according to claim 9, wherein said at least one memory stores instructions that, when executed by the at least one processor, further cause the apparatus at least to:

leave the allocated granted resources to perform sensing operations out for usage as resources to perform communication.

11. A method comprising:

gathering by an apparatus information about one or more sensing service requests raised in a communication network, wherein said communication network comprises sensing nodes and data nodes;

allocating by said apparatus in response to said one or more sensing service requests a plurality of resources from within resources to perform communication of said communication network as resources to perform sensing operations for carrying sensing signals of said sensing nodes;

assigning by the apparatus one or more of the allocated plurality of resources to perform sensing operations to the sensing nodes;

granting by the apparatus respective sensing nodes access to the assigned one or more resources to perform sensing operations;

informing by the apparatus said sensing nodes and data nodes about said granted resources to perform sensing operations;

excluding by the apparatus those resources to perform sensing operations granted to the sensing nodes from being used as resources to perform communication by the data nodes, in order to avoid transmitting communications by the data nodes over said granted resources to perform sensing operations;

cancelling/releasing at least part of said allocated plurality of resources to perform sensing operations, dependent on a first predetermined condition being met, wherein the first predetermined condition is at least one of a detected reduction of a sensing load in said communication network, or a new resource allocation to be used for performing sensing operations; and transmitting cancellation/release information to the sensing nodes, data nodes, or both sending nodes and data nodes.

12. The method according to claim 11, wherein said resources to perform sensing operations comprise time and frequency resources;

wherein said allocating the plurality of resources to perform sensing operations is a periodic time/frequency burst (PTFB) allocation;

wherein said allocating is based on a set of parameters comprising one or more of a time/frequency index of a first time and frequency resource element of the PTFB, a sampling period in time/frequency, or a total aperture in time/frequency; and wherein said set of parameters further comprises at least one of:

a start frame index;

a start subframe index;

a start slot index;

a PTFB periodicity;

a frequency offset between corresponding frequencies allocated in consecutive time periods;

a set of angular indexes used in a resource to perform sensing operations, a maximum transmission power; or a Boolean value indicating an exclusion of a respective PTFB from transmission of any signal.

13. The method according to claim 12, wherein said allocating the plurality of resources to perform sensing operations is at least one PTFB defined by the set of parameters; and wherein further PTFBs in said allocating the plurality of resources to perform sensing operations differ in at least one of the following:

a parameters time/frequency index of a first time and frequency resource element of the PTFB;

sampling period in time/frequency;

start frame index;

start subframe index;

start slot index; or

PTFB periodicity; and wherein the at least one PTFB in said allocating the plurality of resources to perform sensing operations are located within PTFBs of a shared channel of the communication network.

14. The method according to claim 11, further comprising formatting a desired angle field comprising information about predetermined sensing angles;

setting an angular index based on an estimated sensing accuracy;

defining beam sets by matching transmitting and receiving beam sets of the sensing nodes;

setting beam patterns among different sensing nodes while avoiding interference between sensing nodes;

setting on the same time/frequency resource PTFBs among different sensing nodes to orthogonal beam sets; and deciding to blank angular patterns and to schedule orthogonal angles only on a same communication resource block.

15. The method according to claim 11, further comprising applying the assigning and granting to perform sensing operations to such PTFBs whose desired angle is matched to a sensing angle of at least one sensing node out of the sensing nodes.

16. The method according to claim 11, further comprising cancelling/releasing said one or more assigned and granted resources to perform sensing operations, dependent on a second predetermined condition being met, wherein the second predetermined condition is at least one of a detected reduction of a sensing load in said communication network, or a new access grant to the respective sensing nodes; and transmitting cancellation/release information to the sensing nodes and data nodes.

17. The method according to claim 11, further comprising prioritizing a carrying of signals for sensing operations and of signals for communication by providing the signals for sensing and the signals for communication with a priority value, wherein the resources to perform communication are allocated to the carrying of signals for sensing and of signals for communication dependent on the priority value.

* * * * *